(12) United States Patent
Beyers et al.

(10) Patent No.: US 6,372,047 B1
(45) Date of Patent: Apr. 16, 2002

(54) PROCESS AND APPARATUS FOR DIP RECOATING OF OPTICAL FIBERS

(75) Inventors: Robert David Beyers, Piscataway, NJ (US); Arturo Hale, New York, NY (US); Michael Santo, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/473,877

(22) Filed: Dec. 29, 1999

(51) Int. Cl.⁷ .................................................. B05C 3/12
(52) U.S. Cl. ..................... 118/420; 118/405; 118/423
(58) Field of Search .................. 65/529, 432; 118/405, 118/420, 125, 234, 325, 423, 67, 68, 58

(56) References Cited

U.S. PATENT DOCUMENTS

| 2,980,956 A | * | 4/1961 | Whitehurst et al. |
| 4,263,348 A | * | 4/1981 | Renegar |
| 4,419,958 A | * | 12/1983 | Roba |
| 4,636,405 A | * | 1/1987 | Mensah et al. |
| 4,688,515 A | * | 8/1987 | Rosebrooks ................ 118/405 |
| 5,294,260 A | * | 3/1994 | Larsen-Moss et al. |

* cited by examiner

*Primary Examiner*—Brenda A. Lamb
(74) *Attorney, Agent, or Firm*—Birch Stewart Kolasch & Birch LLP

(57) ABSTRACT

A process and apparatus for coating a fiber with a coating material are described. The apparatus includes a coating block and a curing device for curing the coating on the fiber. In the process, the fiber is drawn through the coating block containing the coating material. The coating material on the fiber is then cured in the curing device.

34 Claims, 4 Drawing Sheets

FIG. 2
FIG. 3
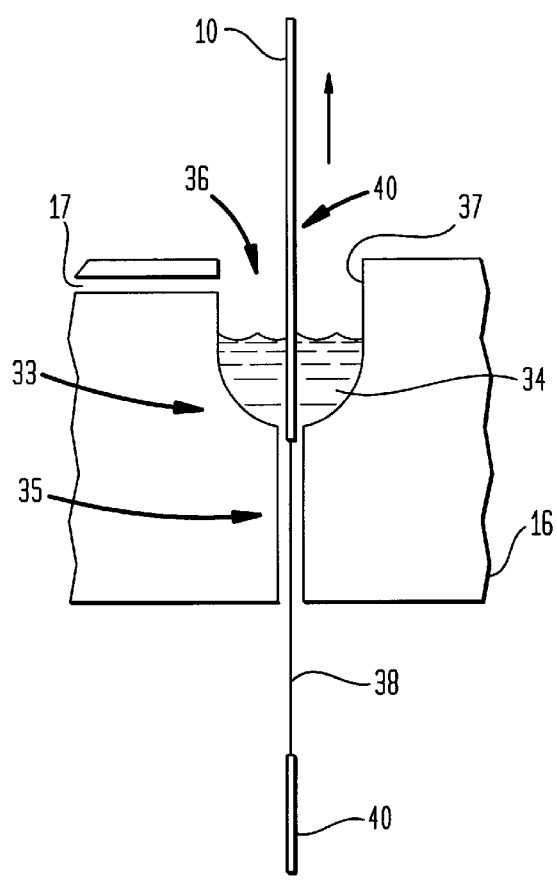
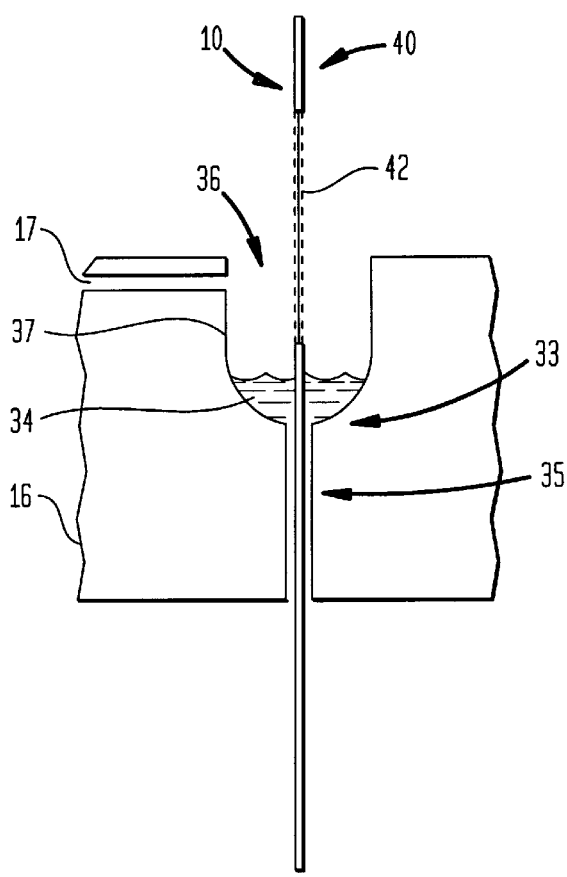

PROCESS AND APPARATUS FOR DIP RECOATING OF OPTICAL FIBERS

Government Contract

This invention was made with government support. The government has certain rights in this invention.

BACKGROUND OF THE INVENTION

1. Field of the Invention

The present invention relates to a process for recoating an optical fiber and an apparatus used to recoat optical fibers.

2. Description of Related Art

Optical fibers require a protective layer to ensure integrity under various conditions. This layer serves as a moisture shield as well as providing mechanical protection. Some fibers have a secondary coating to further improve their strength. It may be necessary to remove these protective layers when manufacturing optical components. If they are removed, these protective layers must be reapplied to restore the fiber's mechanical strength and to optimize the optical performance.

In standard fiber recoating processes, the fiber to be recoated is placed in a mold containing the coating material. Once the coating has been applied to the fiber, the fiber must be removed from the mold by mechanical means. However, this is impractical when optical fibers are being coated since optical fibers are inherently fragile. Mechanically removing the optical fiber from the mold can damage or destroy the fiber being coated. Accordingly, a demand for a method and apparatus which efficiently recoats an optical fiber without damaging the fiber exists.

SUMMARY OF THE INVENTION

According to the invention, a coating is applied to an optical fiber or optical component by drawing it through a passageway in a coating block which contains the coating material. The coated fiber then enters a curing device where the coating on the fiber is cured. More specifically the passageway defines a reservoir, having larger and smaller diameter portions, which contains the coating material. The coating material can be injected into the reservoir through a port in the coating block. The curing device can comprise a curing chamber, an ultraviolet light source and a gas supplier which supplies gas to the curing chamber.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein:

FIG. 2 illustrates a cross-sectional view of a coating block containing a fiber in a starting position before being drawn through a reservoir containing a coating material;

FIG. 3 illustrates a cross-sectional view of a coating block containing a fiber after being drawn through a reservoir containing a coating material;

DETAILED DESCRIPTION OF THE PREFERRED EMBODIMENTS

Figure 1:
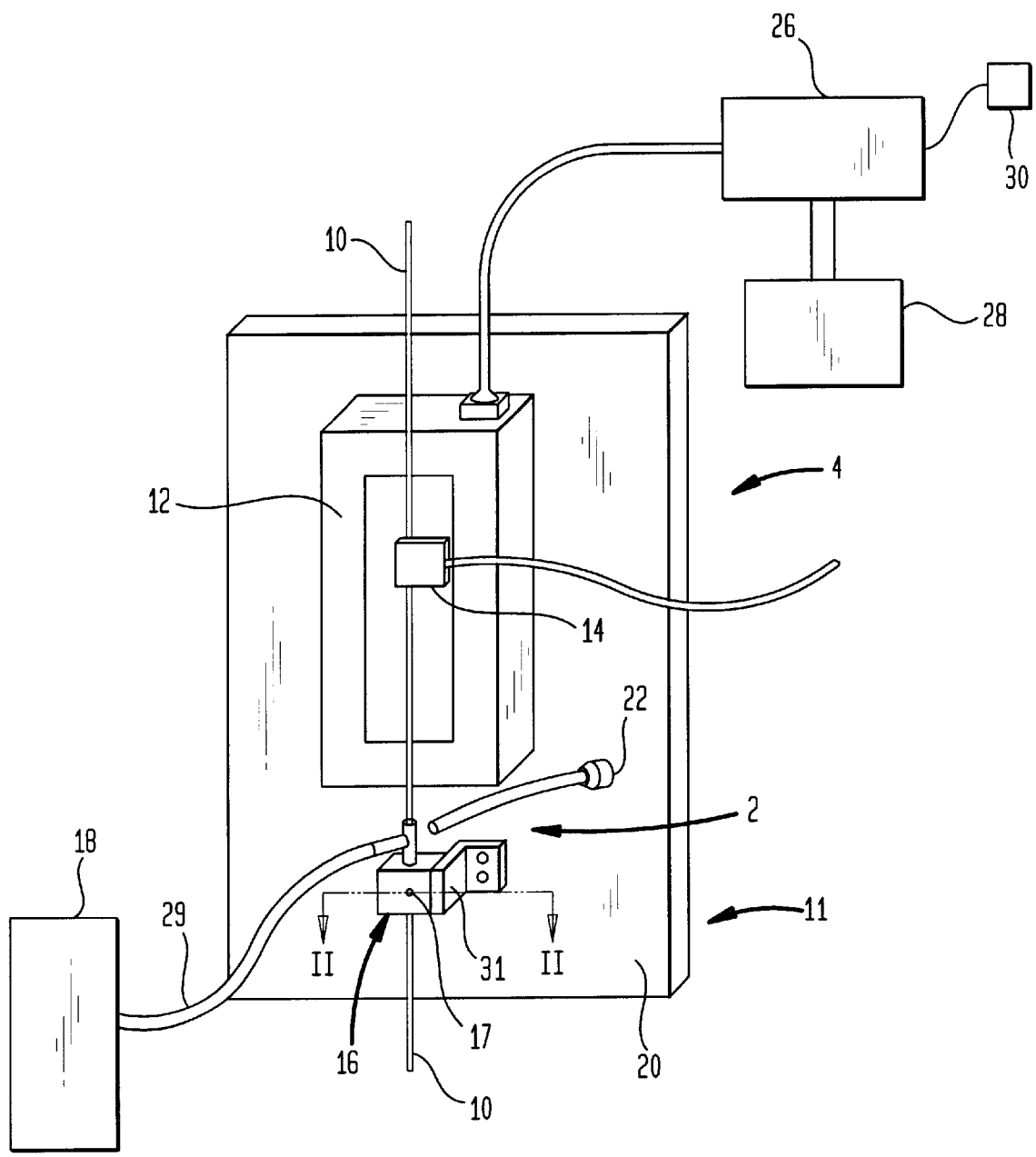
FIG. 1 illustrates an embodiment of a coating apparatus according to the present invention.

FIG. 1 illustrates an embodiment of a coating apparatus 11 according to the present invention. As shown, the coating apparatus 11 includes a coating block 16 mounted to a mounting plate 20 by a bracket 31, a curing device 2 operationally connected to the coating block 16, and a translating device 4 for translating a fiber 10 through the coating block 16 and the curing device 2. Each of the coating block 16, the curing device 2 and the translating device 4 are discussed in detail below.

As shown in FIG. 1, the fiber 10 is held in the coating apparatus 11 by a vacuum fiber holder 14 to which a vacuum is applied by a vacuum source (not shown). The vacuum fiber holder 14 is mounted on a translation stage 12, which is mounted on the mounting plate 20. The translation stage 12 is adapted to move the vacuum fiber holder 14 by the use of a stepper motor (not shown) under the control of a translation stage controller 26. The translation stage controller 26 is controlled by user input supplied via a keypad 28 and is powered by an AC source 30. The keypad 28 can be used by an operator to adjust the speed that the fiber 10 is moved through the coating apparatus 11, and thereby adjust the thickness of a coating material 34 applied to the fiber 10.

Figure 6:
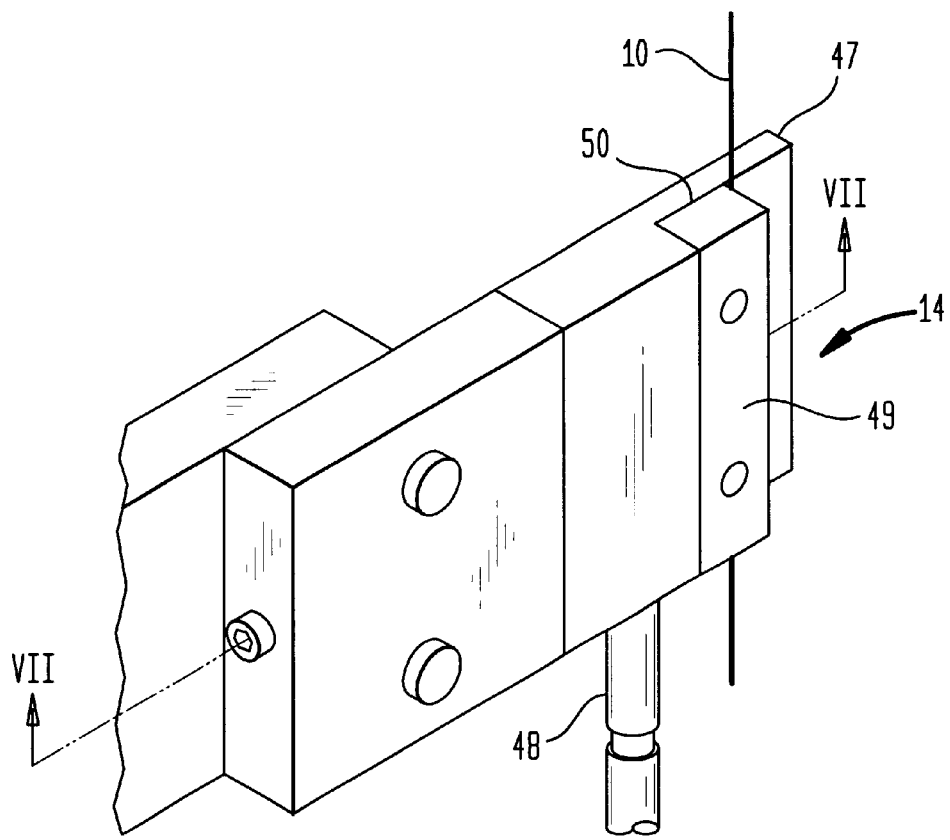
FIG. 6 illustrates an embodiment of a vacuum fiber holder according to the present invention, wherein VII represents the cross-section of the vacuum fiber holder illustrated in FIG. 7.
Figure 7:
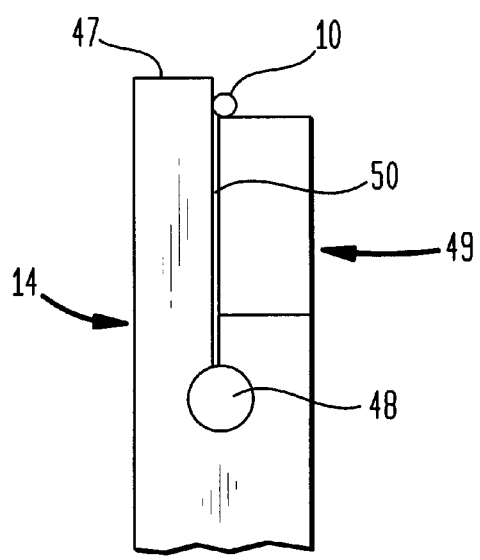
FIG. 7 illustrates a cross-sectional view of an embodiment of a vacuum fiber holder, according to the present invention.

The vacuum fiber holder 14, which is mounted on the translation stage 12, is shown in detail in FIG. 6 and FIG. 7. FIG. 7 illustrates a cross-sectional view of the vacuum fiber holder 14 along line VII—VII, shown in FIG. 6. As shown, vacuum pressure is applied from a vacuum source (not shown) through a vacuum input 48, into a gap 50 formed between a first piece 47 and a second piece 49. The fiber 10 is held in the vacuum fiber holder 14 by the force of the vacuum applied in the gap 50. The vacuum fiber holder 14 holds the fiber 10 in place without pinching the fiber 10 and damaging its coating. The vacuum pressure is applied to the fiber holder 14 and exerts just enough pressure to hold the fiber 10 in place.

As shown in FIG. 1, the curing device 2 includes a curing chamber 32, an ultraviolet light source 22 and a gas source 18. The curing chamber 32 is a glass tube through which the fiber 10 is passed once coated. The ultraviolet light source 22 is directed at the curing chamber 32 in order to cure the coating material 34 on the fiber 10 while inside the curing chamber 32. In a preferred embodiment, the curing chamber 32 is flushed with a gas in order to aid the curing step. The gas source 18 supplies a gas to the curing chamber 32 through a tube 29 which is connected to the curing chamber 32.

The coating block 16 includes an injection port 17 for injecting the coating material 34 into the coating block 16. The coating block 16 is illustrated in detail in FIG. 2.and FIG. 3. FIGS. 2 and 3 illustrate a cross-sectional view of the coating block 16 along line II—II in FIG. 1. As shown, a passageway 33 extends through the coating block 16 and forms a reservoir 36 which is defined by a larger diameter portion 37 and a smaller diameter portion 35 of the passageway 33. As shown, the injection port 17 feeds the coating material 34 into the reservoir 36 within the coating block 16.

Figure 4:
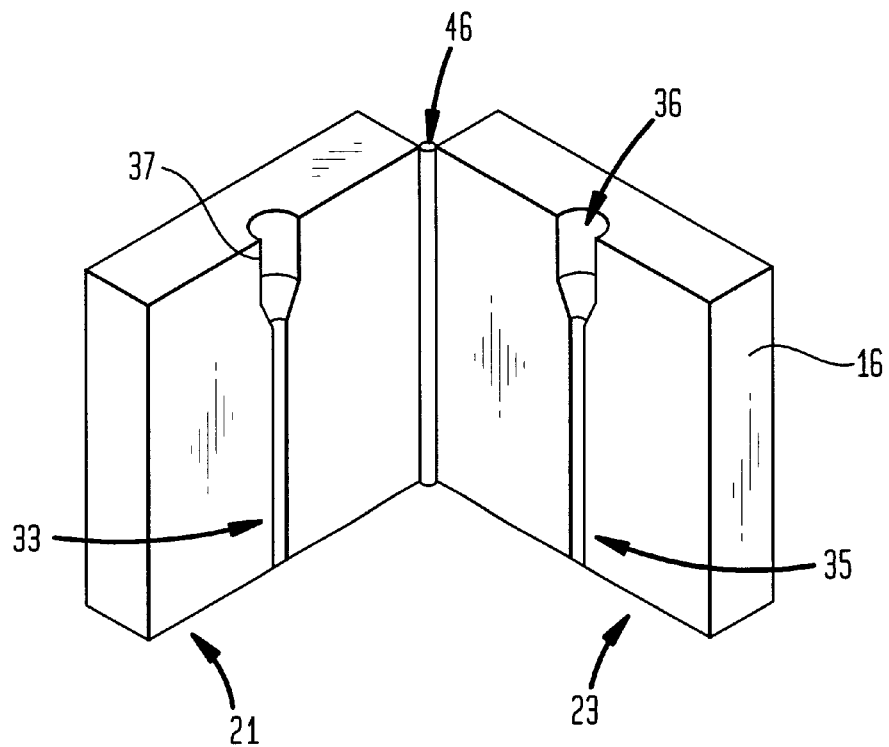
FIG. 4 illustrates an embodiment of a hinged coating block according to the present invention.

FIG. 4 illustrates an embodiment of a hinged coating block according to the present invention. The coating block 16 is separable into two parts, a first part 21 and a second part 23. The first part 21 is hinged to the second part 23 by a hinge 46.

Figure 5:
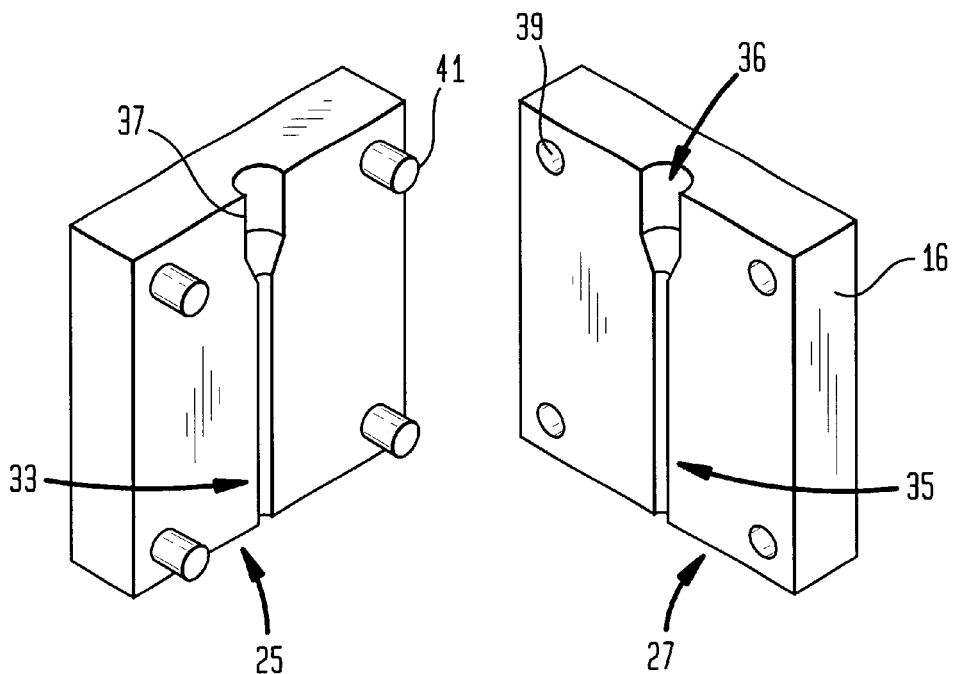
FIG. 5 illustrates an embodiment of a pegged coating block according to the present invention.

FIG. 5 illustrates an embodiment of a pegged coating block according to the present invention. The coating block 16 is separable into two parts, a first part 25 and a second part 27. Pegs 41 are attached to the first part 25. Holes 39, in which the pegs 41 are adapted to fit, are formed in the second part 27. To attach the first part 25 to the second part 27, the pegs 41 are inserted into the holes 39 forming a friction fit in order to hold the first part 25 and the second part 27 together.

Operation of the Invention

Next, the operation of the present invention will be described. As shown in FIG. 1, the fiber 10 is threaded up through the coating block 16 and through the curing chamber 32. FIG. 2 and FIG. 3 illustrate the fiber 10 threaded through the coating block 16 in detail. The fiber 10 is threaded through the reservoir 36 formed by the passageway 33 in the coating block 16. If a hinged or pegged coating block is being used, as illustrated in FIG. 4 and FIG. 5, it is not necessary to thread the fiber 10 through the passageway 33. Instead, the fiber 10 can be placed in the reservoir 36 within the passageway 33 in the coating block 16 while the coating block 16 is open. The fiber 10 can then be threaded through the curing chamber 32. The portion of the fiber 10 to be recoated is positioned so that the top of the portion to be recoated is immediately below the coating block 16.

A portion of the fiber 10 above the curing chamber 32 is secured in the vacuum fiber holder 14 by placing the fiber 10 against the gap 50 formed in the vacuum fiber holder 14 between the first piece 47 and the second piece 49 as illustrated in FIG. 6 and FIG. 7. The vacuum is then applied via the vacuum input 48 from the vacuum source (not shown) to hold the fiber 10 against the vacuum fiber holder 14. Using the keypad 28, the operator sets the speed of the translation stage controller 26. For example, the translation speed can be set at 200 microns/sec. The ultraviolet light source 22, such as a UV lamp (ELC600), is positioned such that the ultraviolet light will be directed into the curing chamber 32. Depending on the ultraviolet light source 22 used, it may be possible to set the UV light exposure time. The gas source 18 supplies a gas to the curing chamber 32 through the tube 29 connecting the gas source 18 to the curing chamber 32.

The coating material 34 is injected into the reservoir 36 inside the coating block 16 through the injection port 17. Using the keypad 28, the operator then sets the translation stage 12 in motion, allowing the fiber 10 to move through the reservoir 36 and curing chamber 32. As illustrated in FIG. 2 and FIG. 3, the fiber 10 has a coated portion 40 and an uncoated portion 38. In FIG. 2, the fiber 10 is in a starting position in the coating block 16 prior to being drawn through the passageway 33. FIG. 3 illustrates a cross-sectional view of the coating block 16 after the fiber 10 has been drawn through the passageway 33. The uncoated portion 38 of the fiber 10 is recoated with the coating material 34 so as to provide a recoated portion 42 of the fiber 10. The recoated portion 42 of the fiber 10 then enters the curing chamber 32, and ultraviolet light from the ultraviolet light source 22 cures the coating material 34 on the fiber 10. Once the coating material 34 on the fiber 10 has been cured, the operator stops the motion of the translation stage 12, and the vacuum source 52, the gas source 18 and the ultraviolet light source 22 are turned off. The recoated fiber can then be removed from the coating apparatus 11 by de-threading the fiber 10 through the coating apparatus 11, or by opening the coating block 16 and removing the fiber 10 before de-threading the fiber 10 from the curing chamber 32. Once cured, the fiber 10 may be handled immediately.

Alternatives Embodiments of the Invention

Although the description of the coating method according to the present invention has been directed to fibers in general, and optical fibers in particular, any fiber, optical fiber, wire or optical component may be coated using the apparatus and method of the present invention as long as the object to be coated can be accommodated by the reservoir containing the coating material and the curing device. Suitable optical components include, for example, tapered fiber bundle optical components, wave division multiplexers, couplers, and splitters. The object being coated may be moved through the coating apparatus of the invention, or if the object is fixed to an immovable assembly, the coating apparatus can be moved relative to the object being coated. The coating apparatus may also be portable instead of fixed on a mounting plate.

Suitable coating materials used in the present invention include, for example, polymers, monomers, adhesives, and glass solders. When an optical fiber is being recoated with a polymer, it may be desirable that the optical signal be contained within the optical fiber. In such a situation, the polymer coating material should have an index of refraction which is lower than that of the glass fiber carrying the optical signal. In other situations, it may be desirable to use a polymer having a higher refractive index than the optical fiber being coated. In a preferred embodiment for coating an optical fiber, a low index, fluorinated acrylate polymer, such as that described in U.S. Pat. No. 5,822,489 is used. More preferred is a coating material which comprises a perfluoropolyether or perfluorohydrocarbon backbone end capped with (meth)acrylate groups via urethane groups. For example, a fluorinated diol having repeating ether groups may be used. The type of polymer used as the coating material will determine the curing conditions necessary. For example, some polymers cannot be cured with ultraviolet light in the presence of oxygen, so it is necessary to either remove the oxygen from the curing device by the use of a vacuum, or to purge the curing device with nitrogen gas via the gas supply 18. The thickness of the coating material on the fiber can be adjusted by adjusting the speed at which the fiber moves through the apparatus, or by adjusting the viscosity of the coating material used.

The curing chamber may be designed as a one-piece glass tube, or may be designed in two halves similar to the coating block. This allows for the placement of the fiber being coated into the coating apparatus without having to thread the fiber through the curing chamber.

The gas supplied to the curing chamber may be any suitable gas, such as nitrogen, oxygen or argon gas, and may be selected according to the coating material being used. In some instances, it may not be necessary to use a gas in the curing step. An ultraviolet light source may not be necessary either, depending on the coating material. Alternatives, such as heat or ambient air, may be used to cure the coated fiber.

In a preferred embodiment, nitrogen gas and ultraviolet light are used together to cure a low index, fluorinated acrylate polymer on an optical fiber. More preferably, the nitrogen gas is supplied to the curing chamber at 3–5 psi, and the ultraviolet light exposure time is set at 130 seconds.

The invention being thus described, it will be obvious that the same may be varied in many ways. Such variations are not to be regarded as a departure from the spirit and scope of the invention, and all such modifications are intended to be included within the scope of the following claims.

We claim:

1. An apparatus for coating a fiber with a coating material comprising:
   a coating block including a passageway extending through said block, said passageway for receiving a fiber and a coating material such that as said fiber moves through said passageway, said coating material is applied to said fiber; and
   a curing device for receiving said fiber with said coating material applied thereto, and curing said coating material,
   wherein said curing device comprises a curing chamber that is separable into at least two parts allowing for placement of said fiber in said apparatus without threading the fiber through said curing chamber.

2. The apparatus according to claim 1, wherein said passageway comprises a larger diameter portion and a smaller diameter portion, said larger diameter portion acting as a reservoir.

3. The apparatus according to claim 1, wherein said coating block includes a port for supplying said coating material to said passageway.

4. The apparatus according to claim 1, wherein said coating block is separable into at least two parts.

5. The apparatus according to claim 4, wherein said two parts of said coating block are hinged together.

6. The apparatus according to claim 4, wherein said two parts of said coating block are pegged together.

7. The apparatus according to claim 1, wherein said two parts of said curing chamber are hinged or pegged together.

8. The apparatus according to claim 1, wherein said curing device includes an ultraviolet light source.

9. The apparatus according to claim 8, wherein said curing device includes a gas supplier for supplying a gas to said curing chamber.

10. The apparatus according to claim 9, wherein said gas is nitrogen gas.

11. The apparatus according to claim 1, wherein said coating material is a polymer.

12. The apparatus according to claim 11, wherein said polymer has a refractive index lower than the refractive index of said fiber.

13. An apparatus for coating a fiber with a coating material comprising:
   a coating block including a passageway extending through said block, said passageway for receiving a fiber and a coating material such that as said fiber moves through said passageway, said coating material is applied to said fiber;
   a curing device for receiving said fiber with said coating material applied thereto, and curing said coating material;
   a fiber holder holding said fiber; and
   a translation stage moving said fiber holder such that said fiber is moved through said coating block and said curing device.

14. The apparatus according to claim 13, wherein said fiber is held in place in said fiber holder by a vacuum force.

15. The apparatus according to claim 11, wherein said fiber is held in place in said fiber holder without being pinched.

16. The apparatus according to claim 13, wherein a thickness of said coating material on said fiber is adjusted by adjusting a speed at which said translation stage moves said fiber holder.

17. An apparatus for coating a fiber comprising:
   a fiber holder for holding a fiber; and
   a translation stage for moving said fiber holder such that said fiber is first moved through a coating block for applying said coating material onto said fiber and then through a curing device for curing the coated fiber.

18. The apparatus according to claim 17, wherein said fiber is held in place in said fiber holder by a vacuum force.

19. The apparatus according to claim 17, wherein said fiber is held in place in said fiber holder without being pinched.

20. The apparatus according to claim 17, wherein a thickness of coating material on said fiber is adjusted by adjusting a speed at which said translation stage moves said fiber holder.

21. The apparatus according to claim 17, wherein coating block includes passageway extending through said coating block for receiving said fiber and a coating material such that as said fiber moves through said passageway, said coating material being applied to said fiber.

22. The apparatus according to claim 21, wherein said passageway comprises a larger diameter portion and a smaller diameter portion, said larger diameter portion acting as a reservoir.

23. The apparatus according to claim 21, wherein said coating block includes a port for supplying said coating material to said passageway.

24. The apparatus according to claim 21, wherein said coating material is a polymer.

25. The apparatus according to claim 24, wherein said polymer has a refractive index lower than the refractive index of said fiber.

26. The apparatus according to claim 17, wherein said coating block is separable into at least two parts.

27. The apparatus according to claim 26, wherein said two parts of said coating block are hinged together.

28. The apparatus according to claim 26, wherein said two parts of said coating block are pegged together.

29. The apparatus according to claim 17, wherein said curing device includes a curing chamber.

30. The apparatus according to claim 29, wherein said curing device includes an ultraviolet light source.

31. The apparatus according to claim 30, wherein said curing device includes a gas supplier for supplying a gas to said curing chamber.

32. The apparatus according to claim 31, wherein said gas is nitrogen gas.

33. The apparatus according to claim 29, wherein said curing chamber is separable into at least two parts allowing for placement of said fiber in said apparatus without threading the fiber through said curing chamber.

34. The apparatus according to claim 33, wherein said two parts of said curing chamber are hinged or pegged together.

* * * * *